(12) United States Patent  (10) Patent No.: US 6,862,776 B2
Chen  (45) Date of Patent: Mar. 8, 2005

(54) POSITIONING STRUCTURE OF A RETRACTABLE HANDLE

(76) Inventor: Chia-Yu Chen, Suite 7, Fl. 13, No. 418, Sec. 4, He-Nan Road, Taichung City (TW)

( * ) Notice: Subject to any disclaimer, the term of this patent is extended or adjusted under 35 U.S.C. 154(b) by 0 days.

(21) Appl. No.: 10/420,796

(22) Filed: Apr. 23, 2003

(65) Prior Publication Data

US 2004/0211034 A1 Oct. 28, 2004

(51) Int. Cl.[7] .............................................. A47B 95/02
(52) U.S. Cl. ........................... 16/113.1; 16/422; 16/429; 403/109.5; 81/177.2
(58) Field of Search ............................. 16/113.1, 111.1, 16/405, 406, 422, 429; 403/109.2, 109.1, 109.5; 81/177.2

(56) References Cited

U.S. PATENT DOCUMENTS 2,261,505 A * 11/1941 Schlesinger ................. 403/106
4,095,826 A * 6/1978 Borradori .................... 285/330
5,769,104 A * 6/1998 Uemura ........................ 135/69
6,202,663 B1 * 3/2001 Uemura ........................ 135/65
6,302,614 B1 * 10/2001 Tseng ...................... 403/109.5
6,361,002 B1 * 3/2002 Cheng ......................... 248/161
6,520,192 B1 * 2/2003 Lo ............................. 135/25.4
6,719,331 B1 * 4/2004 Chen ........................... 285/302

* cited by examiner

Primary Examiner—Suzanne Dino Barrett
Assistant Examiner—Mark Williams
(74) Attorney, Agent, or Firm—Rosenberg, Klein & Lee

(57) ABSTRACT

The present invention disclose the positioning structure of a handle comprising a base possessing an axial hole and two hollow spaces mounts on the inner tube; two movable pieces with slanting cambered face provided screw teeth thereon mounts in each of the hollow spaces of the base; a rotating ring mounts on the outer tube; a rotating cone has an axial multilateral hole mounting in the hole of the base and between the two movable pieces, and cone face of the rotating cone provided screw teeth to bite the screw teeth of the movable pieces; and a rotating rod passing through the axial hole of the rotating cone, and one end of the rotating rod is fixed on the rotating ring, so that when rotating the rotating ring can control the retract of the handle.

2 Claims, 5 Drawing Sheets

POSITIONING STRUCTURE OF A RETRACTABLE HANDLE

BACKGROUND OF THE INVENTION

1. Field of the Invention

The present invention relates to a positioning structure of a handle, more particularly to a retractable handle having two sliding tubes can make the positioning of the retractable handle in a firmer manner.

2. Description of the Prior Art

A typical positioning structure of retractable handle is disclosed in Germany Pat. No. 20018889U1, and is shown in FIG. 5, which contains mutually sliding and connecting the inner tube (40) and the outer tube (41). On one end of the inner tube is a base (42) having an axial hole (43), a pillar shaped multilateral rotating rod (45) passing through the hole (43). Both sides of the base of the tube (40) are hollow spaces (44), and a movable piece (46) in each hollow space (44). There is a rotating ring (47) on the outer tube, and on one end of the rotating rod (45) is fixed on the rotating ring (47).

However, this conventional product will result in the following disadvantages caused by poor structure design. The device has the following two disadvantages:

1. Unstable fixing: conventional products applied the non-round shape eccentric protruding part on the rotating rod to rotate and push the movable piece, then pushing the base which is countered to the base to move outward then prop to the inner wall of the outer tube, thus fixed the inner and the outer tube. However, the movable piece, which counters to the eccentric protruding part, will generate contrary counterforce to the rotating rod. Though those conventional product came with springs, ball bearings as fixing structure, the fixing force from the ball bearings are not sufficient, therefore caused the movable piece to spontaneously move inward and be unable to fix between the inner and outer tubes.

2. Damaged easily: the conventional products applied the eccentric protruding part on the rotating rod to push the movable piece which will generate bigger attrition between the eccentric protruding part on the rotating rod and the inner wall of the movable piece. General rotating rods are made of metal, and movable pieces are made of plastic or soft materials, thus after continuous use, the inner wall of the movable piece will be worn and torn by the rotating rod and being ported and the internal diameter gets bigger, thus the rotating rod will be unable to push the movable piece outward and fix, so the sliding tube can no longer be used.

SUMMARY OF THE INVENTION

The primary objective of the present invention is to provide a positioning structure of a handle with stable and firm fixing, and invulnerability and durability. A base having an axial hole and two cavities mounted on the inner tube, two movable pieces with slanting cambered face provided screw teeth mounted in each of the cavities of the base, a rotating ring mounted on the outer tube, a rotating cone having an axial multilateral hole mounted in the hole of the base and between the two movable pieces, and the outer periphery of the rotating cone provided screw teeth to bite the screw teeth of the movable pieces; and a rotating rod passing through the axial hole of the rotating cone, and one end of the rotating rod is fixed on the rotating ring; When rotating the rotating ring can control the retract of the handle.

Further objectives and advantages of the present invention will become apparent from a careful reading of the detailed description provided herein below, with appropriate reference to the accompanying drawings.

DETAILED DESCRIPTION OF THE PREFERRED EMBODIMENT

Figure 1:
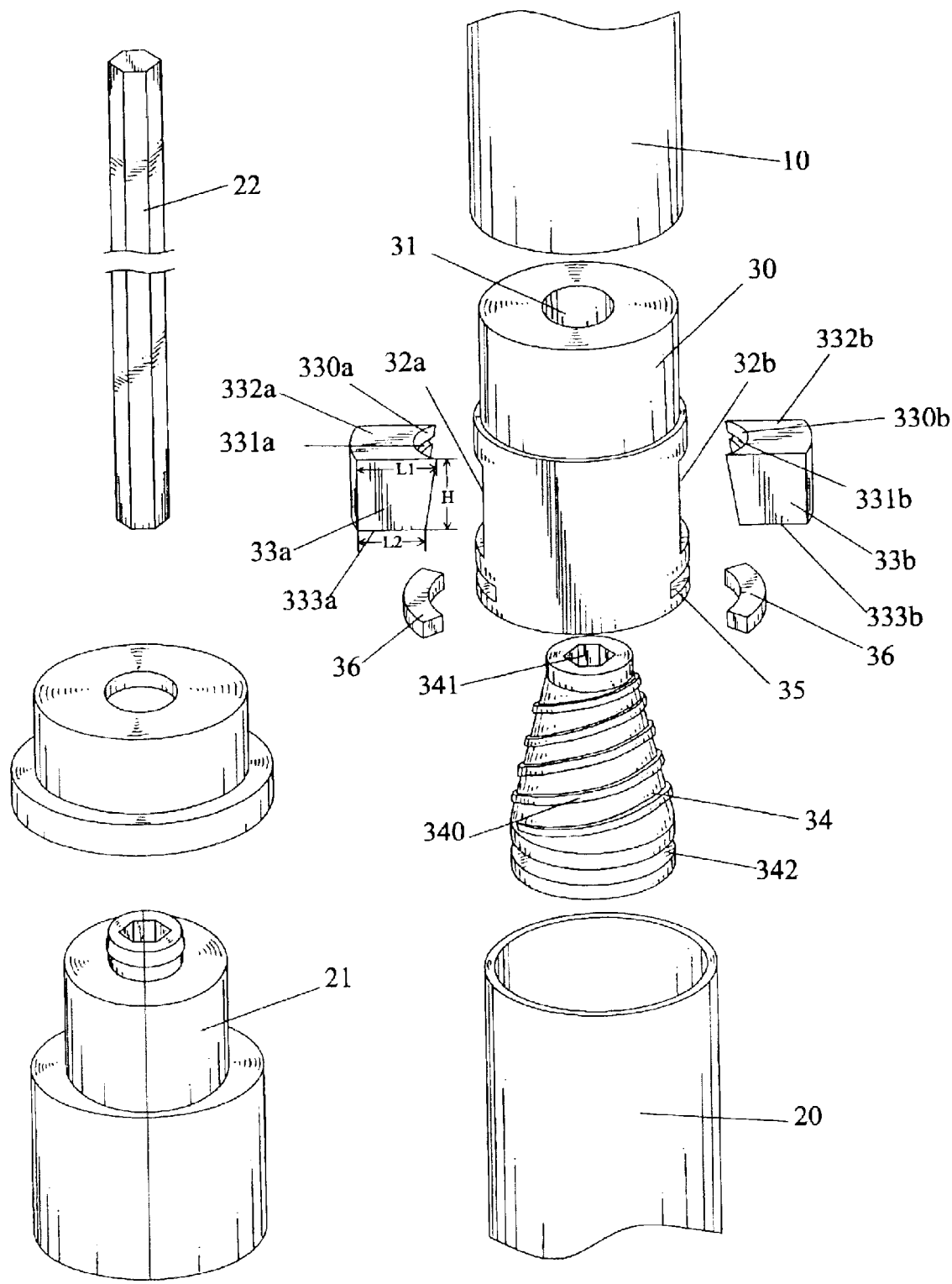
FIG. 1 is an exploded view of the present invention.
Figure 2:
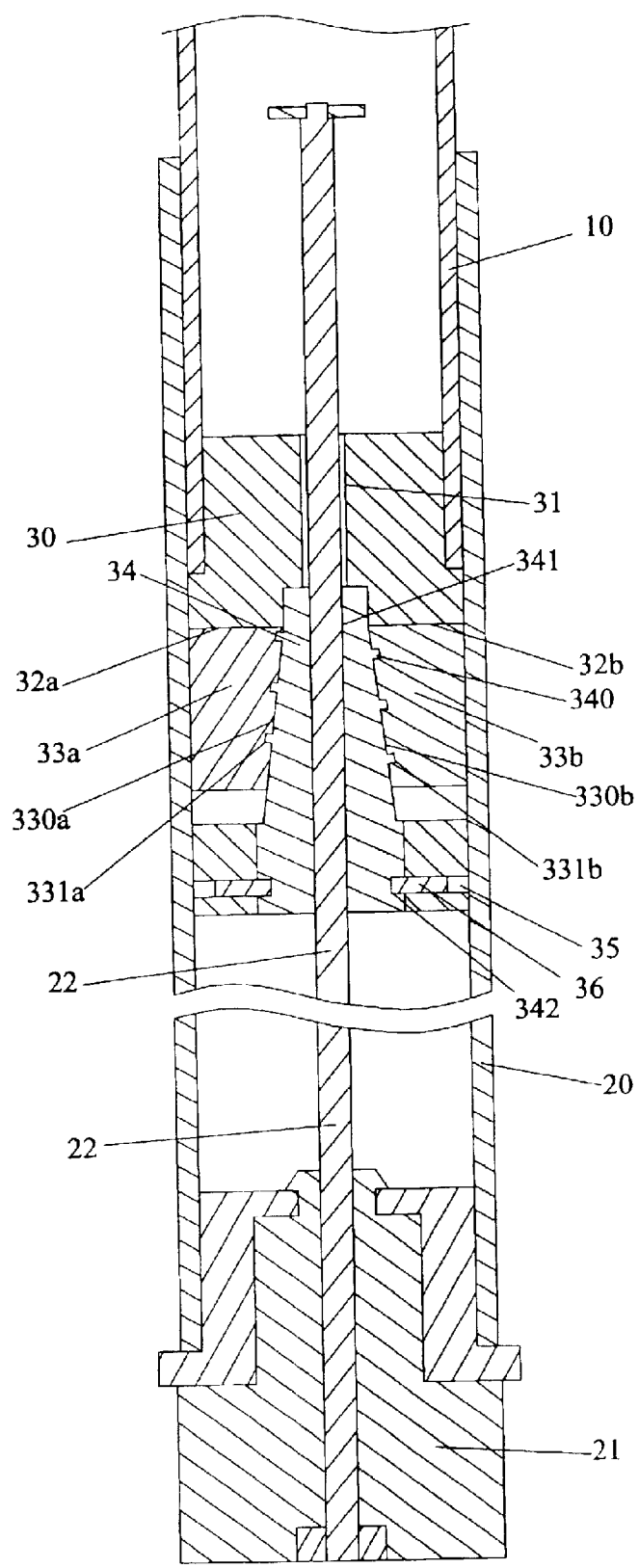
FIG. 2 is a cross-sectional view of the present invention after combination.
Figure 3:
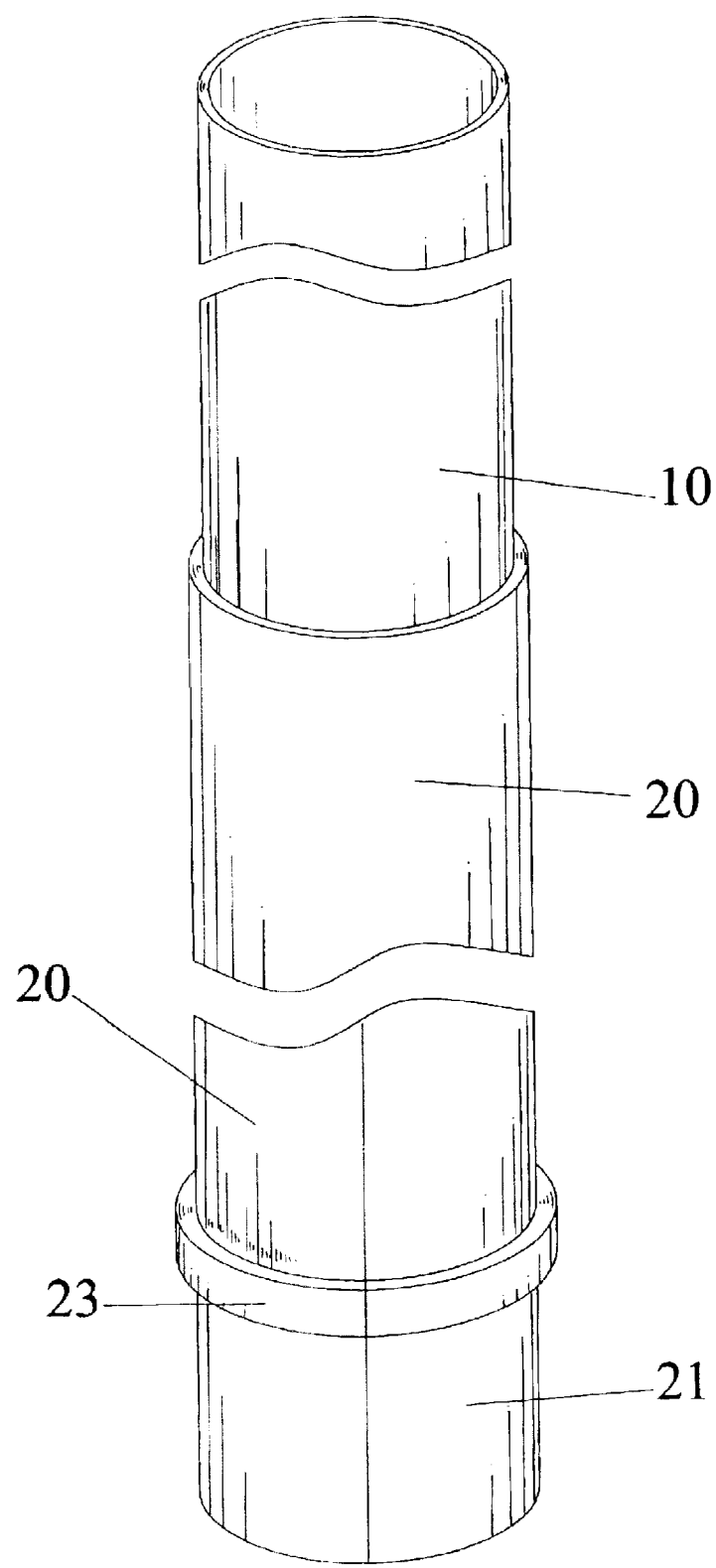
FIG. 3 is a perspective appearance of the invention after combination.

Referring to the drawings, and initially to FIGS. 1 to 3, the present invention comprises the mutually sliding inner tube (10) and outer tube (20). A base (30) defining an axial hole (31) mounts on one end of the inner tube (10), and two cavities (32a)(32b) provided on both sides of the base (30) to make the axial hole (31) connecting with the outer world. A multilateral pillar-shaped rotating rod (22) passes through the axial hole (31). Two movable pieces (33a)(33b) mounts in each of the cavities (32a)(32b) of the base (30), one face of each of the movable pieces (33a)(33b) has a slanting cambered face (330a)(330b), and the slanting cambered face (330a)(330b) of movable pieces (33a)(33b) provided with screw teeth (331a)(331b). A rotating ring (21) mounts on the outer tube (20), and one end of the rotating rod (22) is fixed on the rotating ring (21). A cone-shaped rotating cone (34) has an axial multilateral hole (341) mounted in the axial hole (31) of the base (30), and the outer periphery of the rotating cone (34) provided with screw teeth (340) to engage the screw teeth (331a)(331b) of the movable pieces (33a)(33b). The heights (H) of the movable pieces (33a)(33b) are slightly smaller than the heights of the cavities (32a)(32b) for the convenience of an up and down movement of the movable pieces. The width (L1) of the upper side (332a) (332b) of each of the movable pieces (33a)(33b) is bigger than the width (L2) of the lower sides (333a)(333b) of each of the movable pieces (33a)(33b), and form the inverse trapezoid body.

As best shown in FIGS. 1 and 2, the rotating cone (34) has circular groove (342), the base (30) has receiving hole (35) on the near bottom circumference connecting to the holes (31) of the base (30). Two stoppers (36) mount in the receiving hole (35) and with one end engaged in the groove (342) of the rotating cone (34) to avoid the rotating cone (34) to be departed from the base (30).

Please refer to the display on the FIGS. 1, 2, and 3. When assembling, the first step is placing the two movable pieces (33a)(33b) into the cavities (32a)(32b) of the base (30), then put the rotating cone (34) in from the bottom of the base (30) to position in the axial hole (31), and let the screw teeth (340) of rotating cone (34) to engage the screw teeth (331a)(331b) of the movable pieces (33a)(33b). Then slide the rotating rod (22) into the axial hole (341) of the rotating cone (34) and fix one end of the rotating rod (22) on the rotating ring (21). Then prepare to slide the inner tube (10) in the outer tube (20), to make the base (30) and the movable pieces (33a)(33b) being inside of the outer tube (20). This is the combination style of the present invention.

Figure 4:
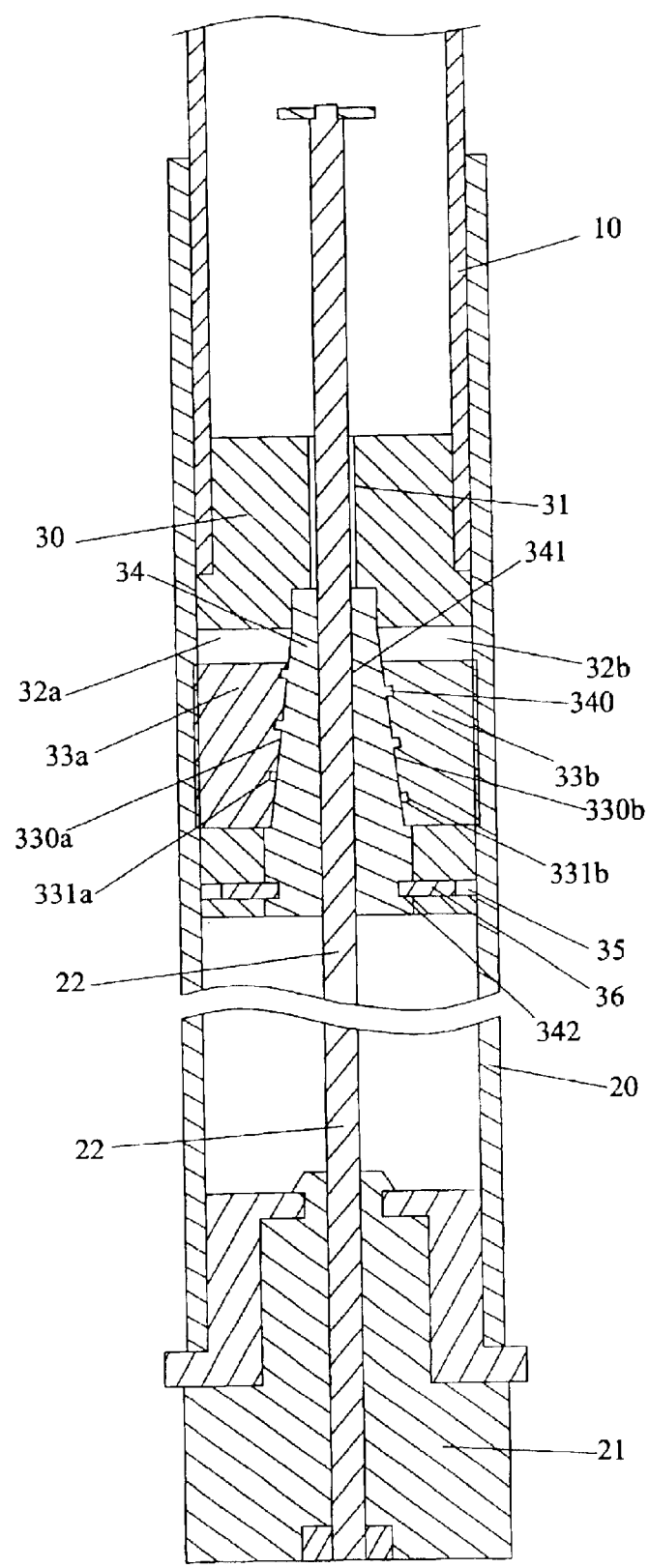
FIG. 4 is a movement cross-sectional view of the present invention.
Figure 5:
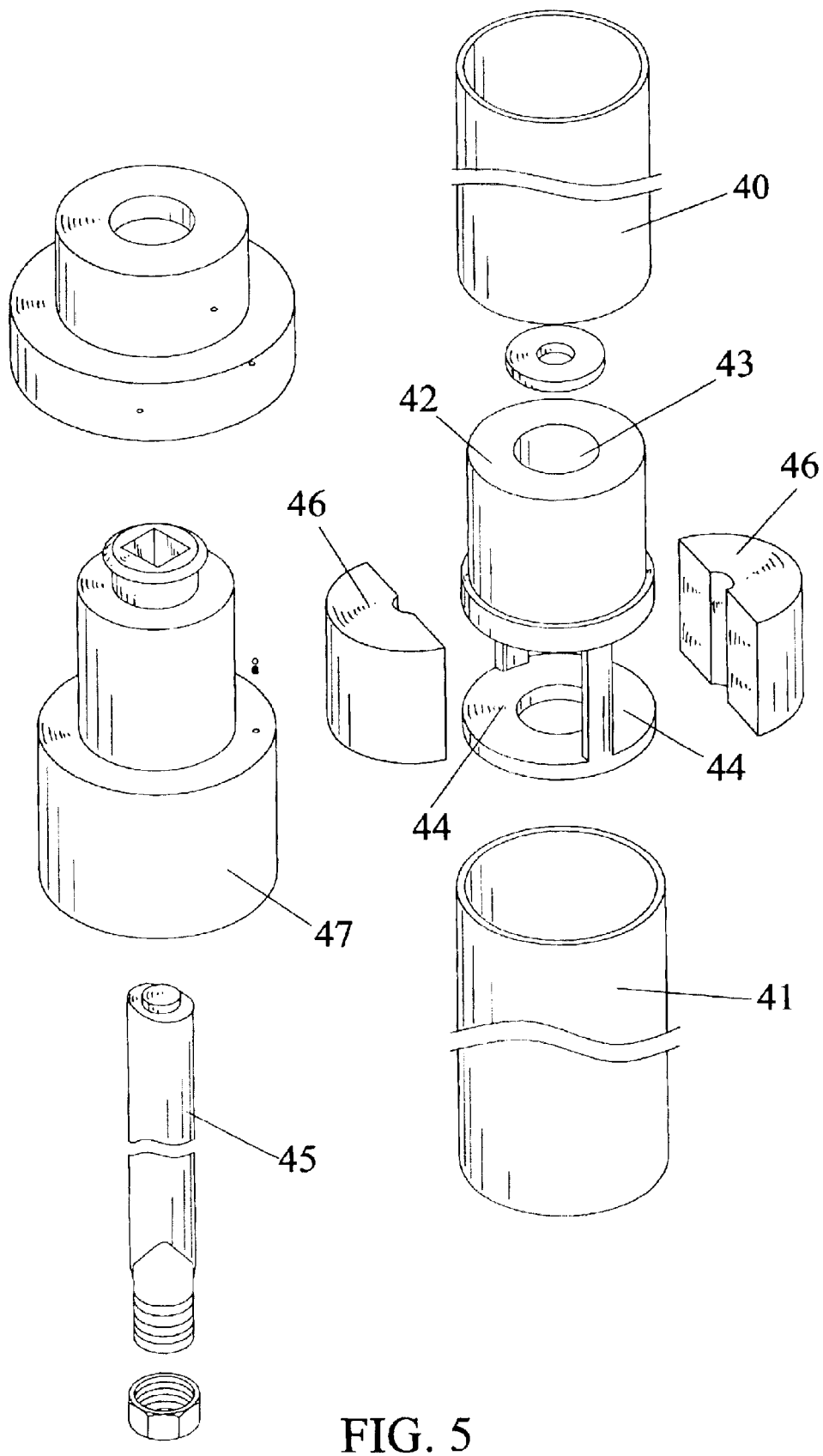
FIG. 5 is a perspective view of typical positioning structure of retractable handle.

Referring to FIGS. 2 and 4, in operations, the user should rotate the rotating ring (21) of the outer tube (20). The rotating rod (22) will rotate with the rotating ring (21), causing the motive force of the rotating ring (21) to drive the rotating cone (34) to rotate by the rotating rod (22). In the mean time, since the screw teeth (340) of the rotating cone (34) and the screw teeth (331a)(331b) of the movable pieces (33a)(33b) are engaged, and the rotating cone (34) has no axis direction movement, so the movable pieces (33a)(33b) move down and generate lateral movement and protrude out the circumference of the base (30) and tightly prop up the inner wall of the outer tube (20) to fix and stop the inner tube (10) and the outer tube (20). Rotating the rotating ring (21) in reverse to cause rotate the rotating cone (34) to loosen the movable pieces (33a)(33b) from the inner wall of the outer tube (20) will adjust the connecting length of the inner tube (10) and the outer tube (20).

Therefore, concluding the structure described above, the present invention certainly has the following advantages:

1. Firm fixing: the present invention adds an attached rotating cone and set screw teeth on each of the movable pieces and rotating cone attaching faces. The rotating cone can firmly move the counter movable piece and applies the cone slanting screw teeth to effectively drive the movable piece outward to tighten against the inner wall of the outer tube. The movable piece can stand firmly against the inner wall of the outer tube by the strong counterforce of the con slanting screw teeth, and therefore can largely increase the fixing firmness and stability.

2. High durability and low fragility: the present invention adds a cone shape screw teeth cone on the rotating rod and set the screw teeth on the attaching faces between screw teeth cone and movable pieces. The driving force from the screw teeth is strong, stable, and causes less attrition between components, thus largely increasing the durability.

What is claimed is:

1. A positioning structure of a retractable handle comprising two mutually sliding tubes; a base defining an axial hole mounted on one end of the inner tube, and two cavities provided on both sides of the base, said two cavities communicating with the hole; two movable pieces mounted in each of the cavities of the base, the height of each of the movable pieces is smaller than the heights of the cavities, one face of each of the movable pieces having a slanting cambered face so that the width of the upper side of each of the movable pieces being bigger than the width of lower sides of each of the movable pieces, and the slanting cambered face of movable pieces provided with screw teeth; a rotating ring mounted on the outer tube, and one end of a rotating rod fixed on the rotating ring; a rotating cone having an axial multilateral hole, the cone being mounted in the hole of the base and positioned between the two movable pieces, and the outer periphery of the rotating cone provided with screw teeth to engage the screw teeth of the movable pieces, said rotating rod passing through the hole of the rotating cone, and one end of the rotating rod fixed on the rotating ring.

2. The positioning structure of a retractable handle as claimed in claim 1, wherein, the rotating cone having an outer periphery provided with a circular groove, the base having receiving holes in communication with the axial hole of the base, and two stoppers mounted in the receiving holes and with one end engaged in the groove of the rotating cone.

* * * * *